(12) United States Patent
Cusey

(10) Patent No.: US 6,239,732 B1
(45) Date of Patent: *May 29, 2001

(54) ONE-WIRE DEVICE WITH A-TO-D CONVERTER

(75) Inventor: James P. Cusey, McKinney, TX (US)

(73) Assignee: Dallas Semiconductor Corporation, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/059,695

(22) Filed: Apr. 13, 1998

(51) Int. Cl.[7] .............................. H03M 1/12; H03M 1/10
(52) U.S. Cl. ........................................... 341/155; 341/120
(58) Field of Search .................................. 341/120, 155, 341/26, 126, 135, 144, 145, 154, 166; 235/492; 711/115; 365/229; 327/143; 382/276, 299, 300

(56) References Cited

U.S. PATENT DOCUMENTS

| 5,036,320 | * | 7/1991 | Wroblewski | 341/26 |
| 5,168,276 | * | 12/1992 | Huston et al. | 341/141 |
| 5,319,370 | * | 6/1994 | Signore et al. | 341/120 |
| 5,679,944 | * | 10/1997 | Cusey et al. | 235/492 |
| 5,877,720 | * | 3/1999 | Setty et al. | 341/159 |
| 6,005,424 | * | 12/1999 | Douglass | 327/143 |

OTHER PUBLICATIONS

Kymissis et al, "Parasitic Power Harvesting in Shoes," IEEE, p. 136, 1998.*

* cited by examiner

*Primary Examiner*—Patrick Wamsley
(74) *Attorney, Agent, or Firm*—Jenkens & Gilchrist, a Professional Corporation

(57) ABSTRACT

A low power integrated circuit having analog to digital conversion circuitry capable of receiving a plurality of analog signals and converting them to a digital value. The digital value is then transmitted, upon request, over a single wire bus. The accuracy of the analog to digital conversion circuitry can be calibrated via trim codes stored in an onboard EPROM.

12 Claims, 3 Drawing Sheets

ONE-WIRE DEVICE WITH A-TO-D CONVERTER

BACKGROUND OF THE INVENTION

1. Field of the Invention

The present invention relates to a device capable of changing an analog signal to a digital signal and then communicating the converted signal over a single wire bus to a host. More particularly, the present invention relates to a quad input analog to digital converter which converts a plurality of analog signals into a plurality of digital signals that can be communicated over a single wire bidirectional communication bus.

2. Description of Related Art

Analog to digital converters (A-to-D) converters have become common in the electronic industry. In general, an A-to-D converter receives an analog signal and converts the signal into a digital signal. The resulting digital signal is sent in parallel form or in serial form over multi-wire busses.

When an analog signal is sent over a long wire connected to a host system, the integrity of the analog signal decreases over the length of the connection. Conversely, a digital signal's integrity is much less likely to decrease over the same long wire connection. Yet, a drawback of A-to-D converters is that they consume a large amount of energy while performing an A-to-D conversion. Furthermore, A-to-D converters are difficult to incorporate into an analog sensor that is remotely positioned to take an analog reading in a remote location. A-to-D converters require multiple wires to connect the A-to-D converter to a system which uses the digitized output of the converter.

SUMMARY OF THE INVENTION

There is a need for a low power, A-to-D converter that can be coupled directly to an analog sensor and provide a digitized signal over as few wires as possible and over a long length of wire to a system or host system that is to use the digitized signal. Such a device would increase the integrity of the signal sensed at a remote location because the signal would be digitized at the remote location instead of after traveling the full, long length of the wire connecting the remotely placed analog device to a host system.

The present invention responds to this need by providing an A-to-D converter that takes an analog voltage level on one of its input pins and converts the analog voltage level to a digital words which can be output via a single wire bus. The single wire bus can be a one-wire data bus which uses a one-wire protocol.

BRIEF DESCRIPTION OF THE DRAWINGS

Various objects and advantages of this invention will become apparent and more readily appreciated from the following description of the exemplary embodiments of the present invention taken in conjunction with the accompanying drawings, of which.

DETAILED DESCRIPTION OF THE EXEMPLARY EMBODIMENTS OF THE PRESENT INVENTION

An exemplary embodiment of the present invention is an A-to-D converter with a one-wire interface. The A-to-D converter is preferably a quad A-to-D converter. In generic terms, the preferred A-to-D converter with a one-wire interface comprises an A-to-D converter with four inputs so that it can convert four different analog signals to digital signals. The signals are converted from an analog voltage level to a digital word which can be output on a one-wire bus. The preferred one-wire bus protocol is that which was created by Dallas Semiconductor of Dallas, Tex. Of course it is understood that other one-wire bus protocols may be used to communicate the digital word from the exemplary embodiment to another device.

Many types of analog sensing are preformed with a wide variety of devices. Temperature, flow, pressure, humidity, direction, flex, speed, volume, fluid level, position, resistance, and distance are a few examples of physical properties that may be expressed as analog voltages.

Manufacturers of the analog devices would like to convert the analog signals to a digital signal at the point of measurement. Due to the sensors being placed in remote locations, there is a need for an economy of physical connections or wires to the remote sensor. Furthermore, there is a need to have the analog signal converted to a digital signal at the remote location and then to send the digital signal over a long length of wire to a host, instead of sending the analog signal through the wire. The digital signal will not degrade as much as an analog signal over the same length of wire.

Figure 1:
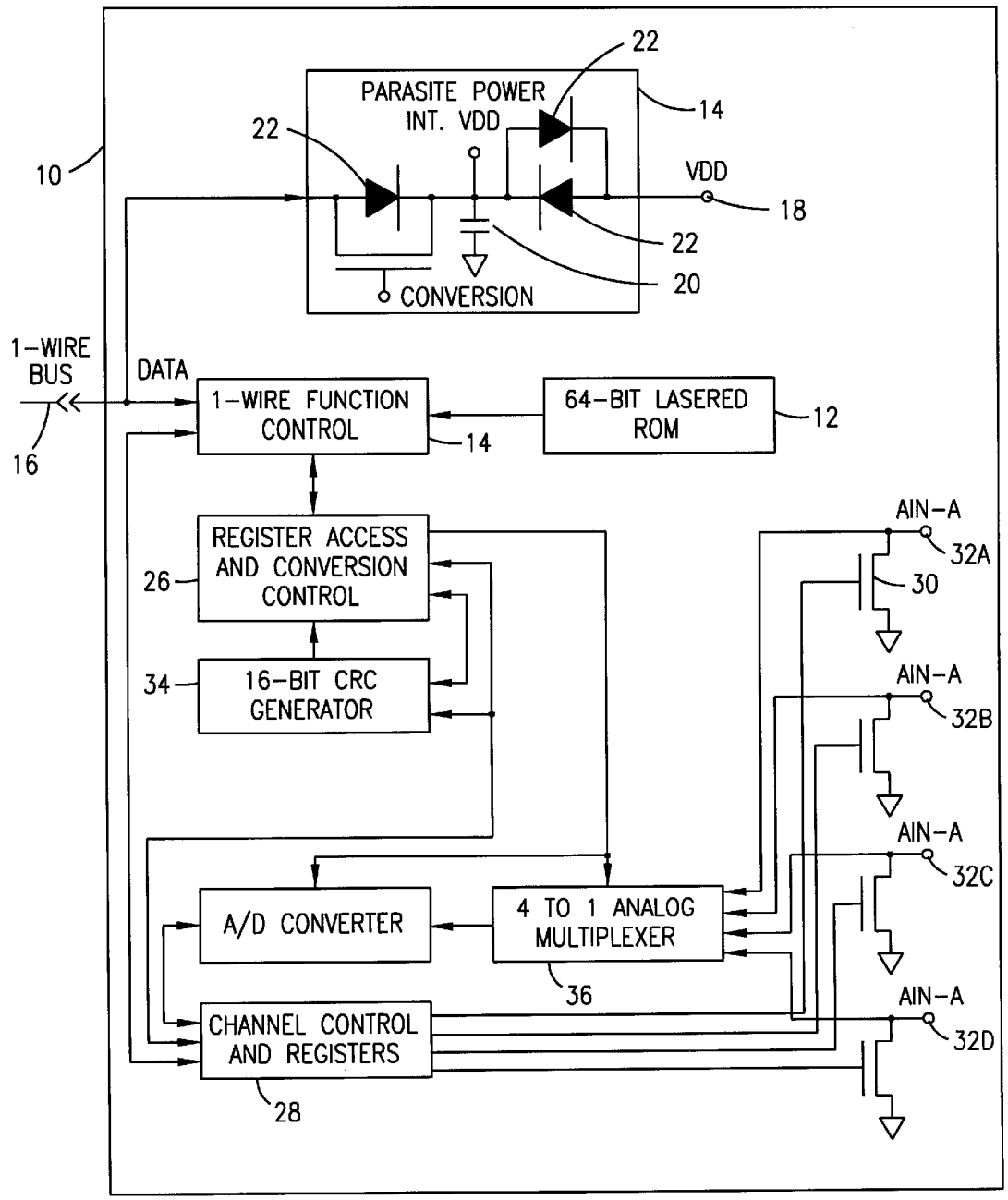
FIG. 1 depicts a block diagram of an exemplary one-wire A-to-D conversion device.

Referring now to FIG. 1 an exemplary embodiment of the present invention is shown in the form of the major junction blocks of the A-to-D converter with a one-wire bus 10. The preferred A-to-D converter with a one-wire bus 10 contains a factory-lasered registration number that includes a unique 48-bit serial number an 8-bit CRC, and an 8-bit family code. These are all contained in the 64-bit lasered ROM 12. The 64-bit ROM 12 portion of the exemplary A-to-D device 10 not only creates an absolutely unique electronic identification for the device, but also can be used to locate and address the A-to-D device 10 in order to exercise its control functions.

Referring now to the block labeled parasitic power 14, the exemplary A-to-D device 10 obtains its power either from the one-wire bus 16 or through its $V_{DD}$ pin 18. Without the $V_{DD}$ supply the device stores energy on an internal parasitic capacitor 20 during periods when the signal line (one-wire bus) is high and continues to operate off the parasitic capacitor 20 power source during low signals on the one-wire data bus while the capacitor waits until the one-wire data line 16 returns to a high state to replenish the energy in the parasitic capacitor 20. Diodes 22 are connected in this parasitic power circuit 14 to aid the parasitic power process. If multiple one-wire A-to-D devices 10 are operating simultaneously on the same one-wire bus 16, then a strong pull-up of the one-wire bus 16 to 5 volts or a $V_{DD}$ power supply is required.

Figure 2:
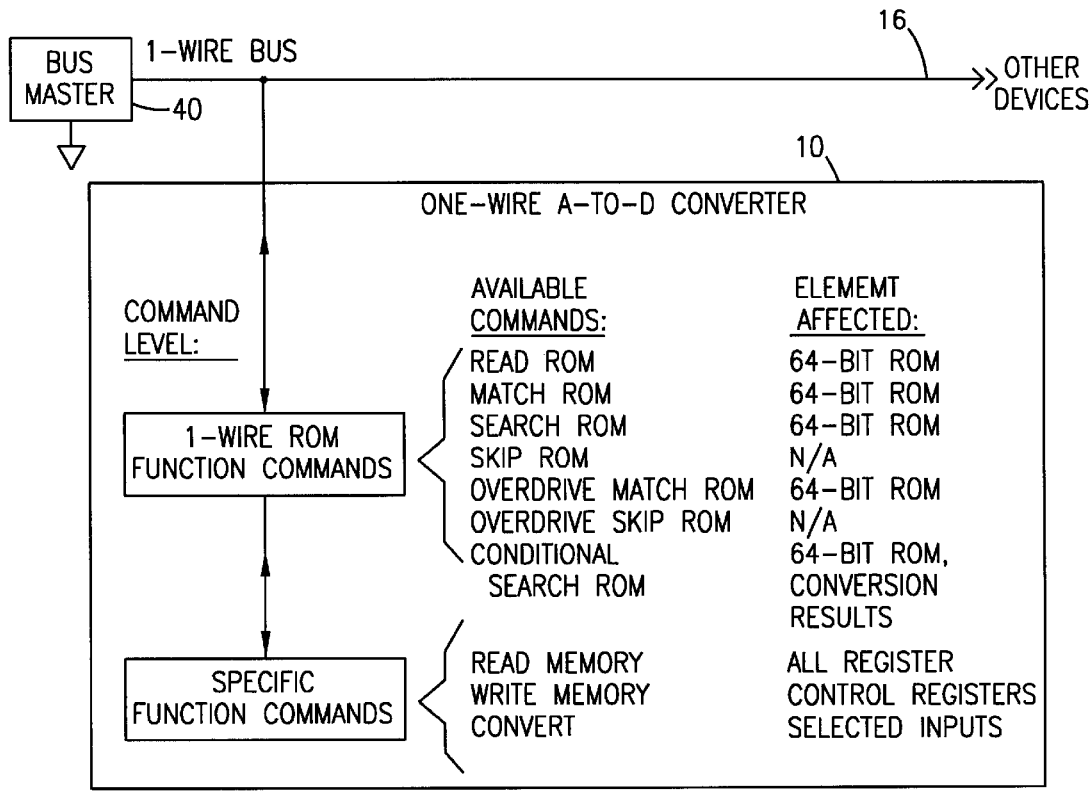
FIG. 2 depicts an exemplary one-wire A-to-D converter in communication with a host and the hierarchical structure for a preferred one-wire protocol.

The one-wire function control circuitry 24 interprets one wire function commands. Although, any single wire communication protocol could be used, the preferred exemplary one-wire A-to-D converter device uses the standard Dallas Semiconductor one-wire protocol for data transfers. The one-wire function control 24 handles communication with the one-wire bus 16. FIG. 2 depicts a hierarchical structure for one-wire protocol. Communication to and from the A-to-D device 10 preferably requires a single bi-directional line 16 that is typically connected to a port pin of a microcontroller or bus master 30. The one-wire bus master 40 must first provide one of seven ROM function commands, 1) read ROM, 2) match ROM, 3) search ROM, 4) conditional search ROM, 5) skip ROM, 6) overdrive-skip ROM, or 7) overdrive-match ROM. Upon completion of an overdrive ROM command byte executed at standard, the A-to-D device's one-wire bus 16 will enter an overdrive mode where all subsequent communication occurs at a higher speed.

The present preferred exemplary embodiment is compatible with both multi-drop and overdrive aspects of the one-wire protocol. The multi-drop ability allows many one-wire devices to be connected to the same one-wire bus 16.

The register access and conversion control block of FIG. 1 decodes commands that the exemplary A-to-D converter device 10 understands and modifies the appropriate registers within the device. The registers are found in the channel control and register portion 28 of the circuitry. The internal registers control many aspects of the A-to-D conversion processes. Commands, such as write registers, read registers and convert, are decoded in register access and conversion control block 26 and sent to the channel control and registers block 28 where the registers are updated.

Referring now to the channel control and register block 28, the registers will now be discussed. Table 1 and Table 2 (both below) indicate preferred registers for use in the present A-to-D device 10. All of the registers of the exemplary one-wire A-to-D device 10 are mapped into a linear memory range of 24 adjacent bytes organized as three 8-byte pages. The first page, called conversion read-out contains the memory area where the results of a conversion for the bus master 40 to read is placed. Starting with the channel at the lowest address, each channel has an area of 16-bits assigned for the conversion result (see Table 1). The power-on default for the conversion read-out registers is all zeros. Regardless of the resolution requested, the most significant bit of the conversion is always at the same bit location. If less than 16 bit resolution is requested, the least significant bits of the conversion result will be filled with zeros in order to generate a 16-bit result. For applications that require less than four analog inputs, the D input should be used first. The advantage here is that when reading the conversion results one reaches the end of the page and, with it, the CRC sooner and thereby minimizes the traffic on the one-wire bus 16.

TABLE 1

| Address | bit 7   | bit 6 | bit 5 | bit 4 | bit 3 | bit 2 | bit 1 | bit 9   |
|---------|---------|-------|-------|-------|-------|-------|-------|---------|
| 00      | A       | A     | A     | A     | A     | A     | A     | LSBIT A |
| 01      | MSBIT A | A     | A     | A     | A     | A     | A     | A       |
| 02      | B       | B     | B     | B     | B     | B     | B     | LSBIT B |
| 03      | MSBIT B | B     | B     | B     | B     | B     | B     | B       |
| 04      | C       | C     | C     | C     | C     | C     | C     | LSBIT C |
| 05      | MSBIT C | C     | C     | C     | C     | C     | C     | C       |
| 06      | D       | D     | D     | D     | D     | D     | D     | LSBIT D |
| 07      | MSBIT D | D     | D     | D     | D     | D     | D     | D       |

Table 2 depicts the control and status information for all channels. The control and status information is located in memory page 1. Each channel is assigned 16 bits. The four least significant bits, called RC3 to RC0, are an unsigned binary number that represent the number of bits to be converted. A code of 1111 (15 decimal) will generate a 15-bit result. For a full 16-bit conversion the code number should be 0000. The next two bits beyond RC3 will always read 0; at present they have no function.

TABLE 2

| Address | bit 7 | bit 6 | bit 5 | bit 4 | bit 3 | bit 2 | bit 1 | bit 0 |
|---------|-------|-------|-------|-------|-------|-------|-------|-------|
| 08      | OE-A  | OC-A  | 0     | 0     | RC3-A | RC2-A | RC1-A | RC0-A |
| 09      | POR   | 0     | AFH-A | AFL-A | AEH-A | AEL-A | 0     | IR-A  |
| 0A      | OE-B  | OC-B  | 0     | 0     | RC3-B | RC2-B | RC1-B | RC-B  |
| 0B      | POR   | 0     | AFH-B | AFL-B | AEH-B | AEL-B | 0     | IR-B  |
| 0C      | OE-C  | OC-C  | 0     | 0     | RC3-C | RC2-C | RC1-C | RC0-C |
| 0D      | POR   | 0     | AFH-C | AFL-C | AEH-C | AEL-C | 0     | IR-C  |
| 0E      | OE-D  | OC-D  | 0     | 0     | RC3-D | RC2-D | RC1-D | RC0-D |
| 0F      | POR   | 0     | AFH-D | AFL-D | AEH-D | AEL-D | 0     | IR-D  |

The next bits, OC (output control) and OE (enable output) control the alternate use of a channel as output (AIN-A, AIN-B, AIN-C, AIN-D) 32. for normal operation as analog input the OE bit of a channel needs to be 0, rendering the OC bit to a don't care. With OE set to 1, a 0 for OC will make the channel's output transistor conducting, a 1 for OC will switch the transistor 30 off. With a pull-up resistor to a positive voltage, for example, the OC bit will directly translate into the voltage equivalent of its logic state. Enabling the output 32 does not disable the analog input 32. Conversions remain possible, but will result in values close to 0 if the transistor 30 is conducting.

The IR bit in the second byte of a channel's control and status memory selects the input voltage range. Preferably, with IR set to 0, the highest possible conversion result is reached at 2.55 V. Setting IR to 1 requires an input voltage of 5.10 V for the same result. The next bit beyond IR does not presently have a function.

The next two bits, AEL alarm enable low and AEH alarm enable high, control whether the device 10 will respond to the Conditional Search command if a conversion results in a value higher (AEH) than or lower (AEL) than the channel's alarm threshold voltage as specified in the alarm settings. The alarm flags AFL (low) and AFH (high) tell the bus master 40 whether the channel's input voltage was beyond the low or high threshold at the latest conversion. These flags are cleared automatically if a new conversion reveals a non-alarming value. They can alternatively be written to 0 by the bus master 40 without a conversion.

The next bit of a channel's control and status memory presently reads 0 and cannot be changed to 1 in the exemplary embodiment. The POR bit (power on reset) is automatically set to 1 as the device performs a power-on reset cycle. As long as this bit is set the device will always respond to the Conditional Search command in order to notify the bus master 40 that the control and threshold data is no longer valid.

The registers for the alarm threshold voltages of each channel are located in memory page 2 with the low threshold being at the lower address (See Table 3). The power-on default thresholds are 00 h for low alarm and FFh for high alarm. The alarm settings are always eight bits. For a resolution higher or equal to eight bits the alarm flag will be set if the eight most significant bits of the conversion result yield a number higher than stored in the high alarm register (AFH) or lower than stored in the low alarm register (AFL). For a resolution lower than eight bits the least significant bits of the alarm registers are ignored.

Figure 4:
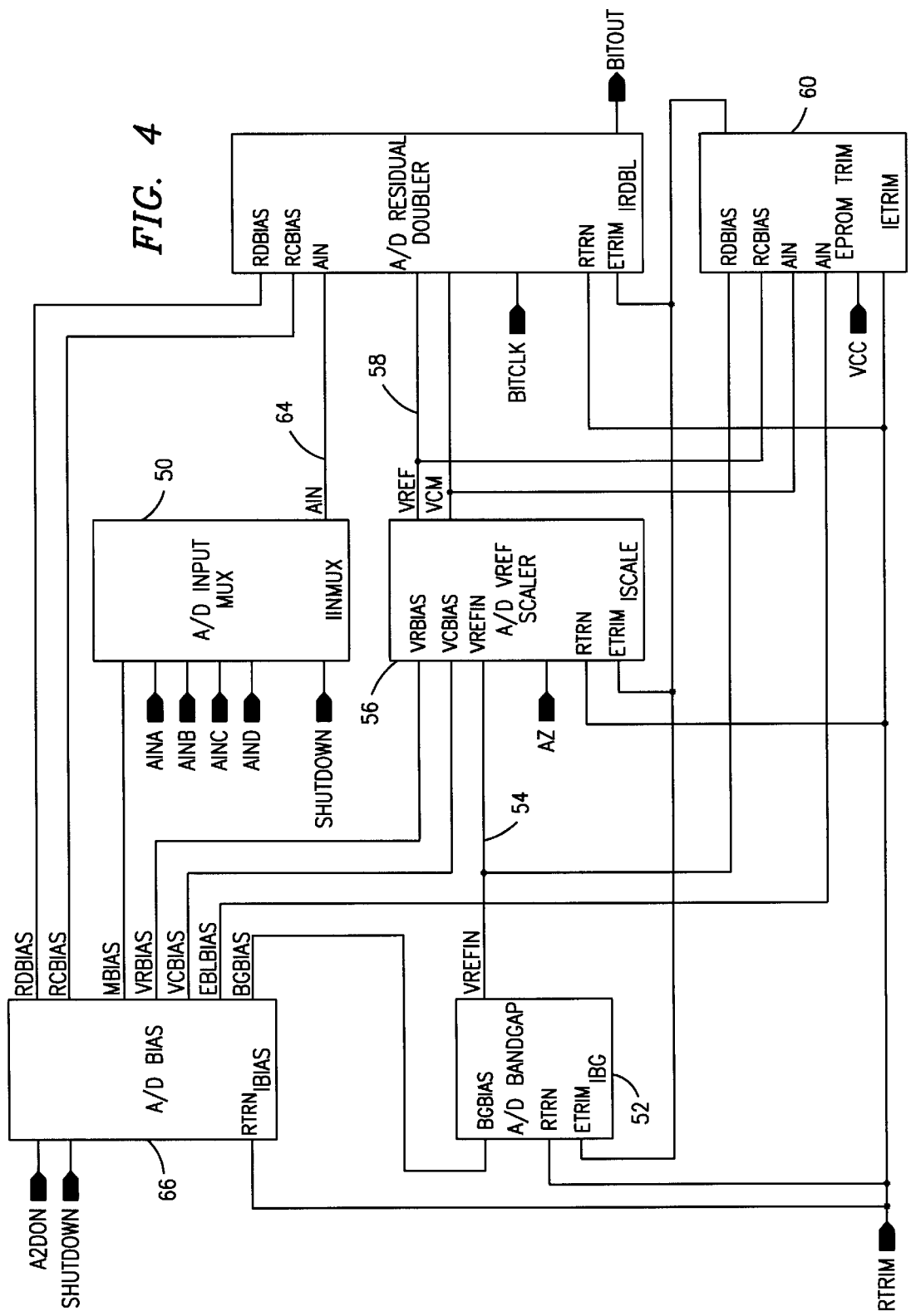
FIG. 4 depicts a block schematic of an exemplary A-to-D converter system found in an exemplary device.

The A-to-D converter circuitry 38, of course, is used to convert the analog signal to a digital signal and then provide the digital signal to the registers so that the converted signal can be formatted into one-wire data protocol and sent to the host 16. FIG. 4 depicts a more detailed block diagram of the 4 to 1 multiplexer and A-to-D converter. The circuit labeled A/D INPUT MUX 50 corresponds to the 4-to-1 Analog Multiplexer shown in FIG. 1. The A/D INPUT MUX 50 is used to select one of the four input channels to feed through to the analog input (AIN) of the rest of the A-to-D circuitry.

The circuitry labeled A/D Bandgap 52 is a portion of the reference voltage generator portion of the A/D converter circuitry. An output from the A/D Bandgap 52 is labeled VREFIN 54. VREFIN 54 is generally a voltage of 1.262 volts due to inherent properties of silicon circuitry. Thus, VREFIN 54 is passed to the A/D VREF scaler circuit 56 which applies a voltage gain to thereby generate the needed 1.280 volts as VREF 58. 1.280 volts is half of the preferred full scale voltage input of 2.560 volts.

The block labeled EPROM Trim 60 which provides trim value of resistance or capacitance to calibrate the band gap 52 and voltage reference circuitry 56. The EPROM Trim circuitry 60 can also be used to calibrate the RC or ring oscillator clock (not shown) which is within the present exemplary one-wire A-to-D device 10.

At present the EPROM 60 is programmed and the device 10 is calibrated during the manufacturing process. It is

TABLE 3

| Address | bit 7 | bit 6 | bit 5 | bit 4 | bit 3 | bit 2 | bit 1 | bit 0 |
| --- | --- | --- | --- | --- | --- | --- | --- | --- |
| 10 | MSBL-A | A | A | A | A | A | A | LSBL-A |
| 11 | MSBH-A | A | A | A | A | A | A | LSBH-A |
| 12 | MSBL-B | B | B | B | B | B | B | LSBL-B |
| 13 | MSBH-B | B | B | B | B | B | B | LSBH-B |
| 14 | MSBL-C | C | C | C | C | C | C | LSBL-C |
| 15 | MSBH-C | C | C | C | C | C | C | LSBH-C |
| 16 | MSBL-D | D | D | D | D | D | B | LSBL-D |
| 17 | HSBH-D | B | B | D | D | D | D | LSBH-D |

In more general terms the registers allow each one of four analog input pins 32 A, B, C, D to be configured differently. For example, for each input pin 32 the A-to-D conversion can operate with different resolutions. The resolution of the A-to-D converter is configurable by the user. The resolution can be specified by what is stored in the registers. The resolution can be, in the preferred embodiment, from 1 to 16 bits. This provides the user with a very versatile device.

Furthermore, the registers can be set or the device can be programmed to get alarms for each channel. The alarms can be for low high or both low and high alarms. Each channel can have different alarm settings. The alarms can be communicated, via the one-wire bus 16, to the host system 40 when and if they are tripped.

The CRC generator circuitry 34 is used as a data integrity check. The preferred embodiment incorporates a 16-bit CRC generator which aids in the determination of data integrity or bit error problems during transmission and receipt of information over the one-wire bus 16.

Still referring to FIG. 1, the 4-to-1 analog multiplexer 36 is connected to the analog inputs A, B, C and D (AIN-A, AIN-B, AIN-C, AIN-D, respectively) 32, A, B, C, D. The present exemplary embodiment can only convert one analog channel at a time. Thus, when the convert command is presented to the device 10, the channel which is to be converted is also communicated. The 4-to-1 analog multiplexer 36 connects which ever one of the four channels is to be converted to the A-to-D converter circuitry 38.

understood that the EPROM 60 could be programed with trim codes and the device could be calibrated by the end user of the device 10. Thus, if aging of the part makes component parameters shift, then the EPROM Trim circuitry 60 can be programmed or reprogrammed to compensate for the shift.

In the exemplary device there are 32 EPROM bits and the bits effect a number of circuits within the present exemplary device 10. Some of the bits change the resistance of variable resistors in the band gap circuit 52. Other bits are used to change the gain in the A/D VREF scaler circuit to compensate the circuitry in order to provide an accurate 1.28 volt output. Still other bits may be used by the A/D residual doubler circuit 62.

The A/D residual doubler 62 is used to help determine the magnitude of the received analog voltage. The AIN signal 64 (the selected analog input signal) is provided to a comparator circuit, within the A/D residual doubler 62, and compared to 1.280 volts. The output of the comparator is the most significant bit of the comparison result. If the bit was a zero, meaning that the selected analog input voltage was less than 1.280 volts, the residual is determined by doubling the input voltage. If the bit was one, meaning that the analog input was greater than the 1.280 volt (half full scale voltage), then the residual is determined by doubling and then the input voltage and subtracting the full scale range (2.560 volts). The residual is fed back into the comparator and compared with the 1.280 volts to determine the next bit and the new residual value. This process continues until the selected resolution is achieved.

An important aspect of the present embodiment is that the user can select the amount of resolution needed. Further, unlike other A-to-D converters which depend heavily on precise matching of MOS devices in the comparator and voltage reference, the present device can compensate for mismatches and inaccuracies by trimming them out using the EPROM trim codes. (See above discussion of the EPROM 60).

Still referring to FIG. 4, the A/D bias circuit 66 provides bias current to the analog components, such as comparators, operational amplifiers or any circuit that requires a mirrored current source. The A/D bias circuit 66 generates reference currents for each analog device in the device that requires a bias current.

Referring back to FIG. 1 and reviewing what was discussed above, each analog input (AIN-A, AIN-B, AIN-C, AIN-D) includes NMOS transistor 30. Each NMOS transistor is a very high gain device. If the end user of the exemplary device does not need to use all the input pins, but does need an open drain output for another component in the user's circuit design, then NMOS device 30 can be used. In essence, the NMOS device 30 allows an input channel that is not being used to have a dual function as an open drain output pin. Such an open drain device can sink enough current to meet the requirements of, for example, a LED device.

Again to review, the present exemplary one-wire A-to-D converter provides a user with a multitude of useful and advantageous options. The one-wire interface provides an economy of wiring connections between a host system and the exemplary one-wire A-to-D converter. Only one single wire connection is required. The exemplary device also allows the user to program the digital resolution required for the specific task. The present A-to-D converter can be programmed to have from 1 to 16 bits of resolution on each of the four channels.

The present A-to-D circuitry requires approximately sixty to eighty microseconds per bit of resolution. The present device would not be considered a high-speed A-to-D converter in today's technology, but would be considered a very low power A-to-D converter. For example, the device may take 500 microseconds to perform an A-to-D conversion and send the result over the single wire bus, but will only sink less than one-half a miliamp during the conversion process. This is an order of magnitude less than any high speed A-to-D converter which performs a comparable task. The trade-off is between computing speed and the required power to perform the A-to-D conversion task.

Still another advantage of the present one-wire A-to-D converter is that it can be trimmed using an EPROM either during manufacturing or by the end user. Thus, the A-to-D conversion circuitry can be accurately trimmed theoretically a moment before the device is to be used.

The following are preferred commands used by the present exemplary one-wire A-to-D converter device 10.

READ MEMORY: The Read Memory command is used to read conversion results, control/status data and alarm settings. The bus master follows the command byte with a two byte address that indicates a starting byte location within the memory map. With each subsequent read data time slot the bus master receives data from the exemplary one-wire A-to-D converter starting at the supplied address and continuing until the end of an eight-byte page is reached. At that point the bus master will receive a 16-bit CRC of the command byte, address bytes and data bytes. This CRC is computed by the exemplary one-wire A-to-D converter 10 and read back by the bus master 40 to check if the command word, starting address and data were received correctly. If the CRC read by the bus master 40 is incorrect, a Reset Pulse must be issued and the entire sequence must be repeated.

WRITE MEMORY: The Write Memory command is used to write to memory pages 1 and 2 in order to set the channel-specific control data and alarm thresholds. The bus master 40 will follow the command byte with a two byte starting address and a data byte. A 16-bit CRC of the command byte, address bytes, and data byte is computed by the exemplary one-wire A-to-D converter 10 and read back by the bus master 40 to confirm that the correct command word, starting address, and data byte were received. The exemplary one-wire A-to-D converter then copies the data byte to the specified memory location. The bus master then receives a copy of the same byte but read from memory for verification. If the verification fails, a Reset Pulse should be issued and the current byte address should be written again.

If the bus master does not issue a Reset Pulse and the end of memory was not yet reached, the exemplary one-wire A-to-D converter 10 will increment its address counter to address the next memory location. The new two-byte address will also be loaded into the 16-bit CRC generator as a starting value. The bus master will send the next byte using eight write time slots. As the exemplary one-wire A-to-D converter 10 receives this byte it also shifts it into the CRC generator and the result is a 16-bit CRC of the new data byte and the new address. With the next sixteen read time slots, the bus master 40 will read this 16-bit CRC from the exemplary one-wire A-to-D converter to verify that the address incremented properly and the data byte was received correctly. If the CRC is incorrect, a Reset Pulse should be issued in order to repeat the Write Memory command sequence.

The decision to continue after having received a bad CRC or if the verification fails is made entirely by the bus master 40. Write access to the conversion read-out registers is not possible.

CONVERT: The Convert command is used to initiate the analog to digital conversion for one or more channels at the resolution specified in memory page 1, control/status data. The conversion takes between 60 and 80 $\mu$s every time the convert command is issued. For four channels with 12 bit resolution each, as an example, the convert command will not take more than 4×12×80 $\mu$s plus 160 $\mu$s offset, which totals to 4 ms. If the exemplary one-wire A-to-D converter 10 gets its power through the $V_{DD}$ pin 18, the bus master 40 may communicate with other devices on the one-wire bus 16 while the exemplary one-wire A-to-D converter 10 is busy with A/D conversions. If the device is powered entirely from the one-wire bus 16, the bus master 40 should provide a strong pull-up to 5V for the estimated duration of the conversion in order to provide sufficient energy. The present exemplary embodiment preferably uses less than 5 milliwatts of power while performing a conversion.

The conversion is controlled by the input select mask (Table 4) and a read-out control byte (Table 5). In the input select mask the bus master 40 specified which channels participate in the conversion. A channel is selected if the bit associated to the channel is set to 1. If more than one channel is selected, the conversion takes place one channel after another in the sequence Input A, B, C, D, (32 A, B, C, D) skipping those channels that are not selected. The bus master 40 can read the result of a channel's conversion before the conversion of all the remaining selected channels is completed. In order to distinguish between the previous result and the new value the bus master 40 uses the read-out control byte. This byte allows to preset the conversion read-out registers for each selected channel to all 1's or all 0's. If the expected result is close to 0 then one should present to all 1's or to all 0's if the conversion result will likely be a high number. In applications where the bus master 40 can wait with reading until all selected channels are converted, a preset of the read-out registers is not necessary.

TABLE 4

| Input Select Mask (Conversion Command) | | | | | | | |
|---|---|---|---|---|---|---|---|
| bit 7 | bit 6 | bit 5 | bit 4 | bit 3 | bit 2 | bit 1 | bit 0 |
| don't care | | | | D | C | B | A |
| bit 7 | bit 6 | bit 5 | bit 4 | bit 3 | bit 2 | bit 1 | bit 0 |
| set D | clear D | Set C | Clear C | Set B | Clear B | Set A | Clear A |

TABLE 5

| Read-Out Control (Conversion Command) | | |
|---|---|---|
| Set | Clear | Explanation |
| 0 | 0 | no preset, leave as is |
| 0 | 1 | present to all 0s |
| 1 | 0 | preset to all 1s |
| 1 | 1 | (illegal code) |

Following the Convert command byte, the bus master 40 transmits the input select mask and a read-out control byte. Now the bus master 40 reads the CRC16 of the command byte, select mask and control byte. The conversion will start not earlier than 10 $\mu$s after the most significant bit of the CRC is received by the bus master 40.

With parasitic power supply 14, the bus master 40 must activate the strong pull-up within this 10 $\mu$s window for a duration that is estimated as explained above. After that, the data line 16 returns to an idle high state and communication on the bus can resume. The bus master 40 would normally send a reset pulse to exit the Convert command. Read data time slots generated after the strong pull-up has ended, but before issuing a reset pulse should result in all 1's if the conversion time was calculated correctly.

With $V_{DD}$ power supply 18, the bus master 40 may either send a reset pulse to exit the Convert command or continuously generate read data time slots. As long as the one-wire A-to-D converter 10 is busy with conversions, the bus master 40 will read 0's. After the conversion is completed the bus master 40 will receive 1's instead. Since in an open-drain environment a single 0 overwrites multiple 1's, the bus master 40 can monitor multiple devices converting simultaneously and immediately knows when the last one is ready. As in the parasitically powered scenario the bus master 40 finally has to exit the Convert command by issuing a rest pulse.

ONE-WIRE BUS SYSTEM: The one-wire bus 16 is a system which has a single bus master 40 and one or more slaves. The preferred one-wire A-to-D converter 10 is a slave device. The discussion of this bus system is broken down into three topics: hardware configuration, transaction sequence, and one-wire signaling (signal types and timing). A one-wire protocol defines bus transactions in terms of the bus state during specific time slots that are initiated on the falling edge of sync pulses from the bus master 40. It is understood that other single wire systems or protocols may potentially be used with the present A-to-D conversion device without straying from the spirit of the invention.

Figure 3:
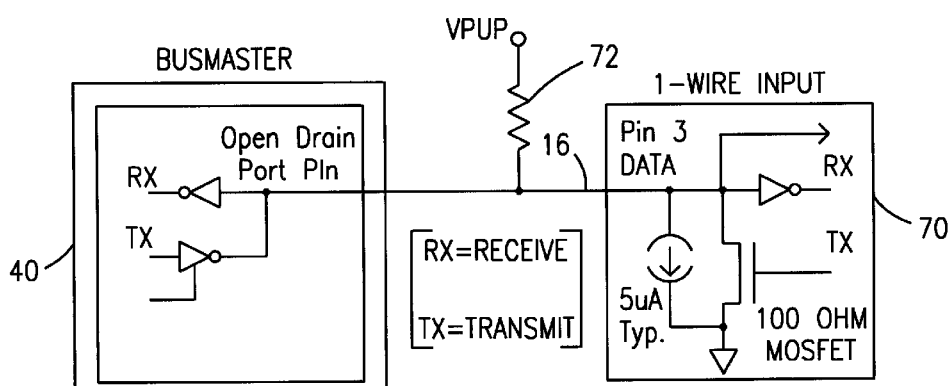
FIG. 3 depicts an exemplary hardware configuration for a one-wire connection between a host device and a one-wire input of an exemplary one-wire A-to-D conversion device.

The preferred one-wire bus 16 has a single line by definition; it is important that each device on the bus be able to drive the bus at the appropriate time. To facilitate this, each device attached to the one-wire bus 16 must have open drain or 3-state outputs. The one-wire port 70 of the one-wire A-to-D converter device 10 is open drain with an internal circuit equivalent to that shown in FIG. 3. A multidrop bus consists of a one-wire bus 16 with multiple slaves attached. At regular speed the one-wire bus has a maximum data rate of 16.3 k bits per second. The speed can be boosted to 142 k bits per second by activating the Overdrive Mode. The one-wire bus requires a pull-up resistor 72 of approximately 5 k$\Omega$ to 1.5 k$\Omega$.

The idle state for the one-wire bus 16 is high. If for any reason a transaction needs to be suspended, the bus MUST be left in the idle state if the transaction is to resume. If this does not occur and the bus is left low for more than 16 $\mu$s (regular speed), one or more devices on the bus may be reset.

The protocol for accessing the one-wire A-to-D converter via the one-wire port is as follows: (1) Initialization, (2) ROM Function Command, (3) Memory/Convert Function Command, and (4) Transaction/Data.

All transactions on the one-wire bus 16 begin with an initialization sequence. The initialization sequence consists of a reset pulse transmitted by the bus master 40 followed by presence pulse(s) transmitted by the slave(s).

The presence pulse lets the bus master 40 know that the one-wire A-to-D converter 10 is on the bus 16 and is ready to operate.

Once the bus master 40 has detected a presence, it can issue one of the seven ROM function commands. All ROM function commands are eight bits long.

READ ROM: This command allows the bus master 40 to read the one-wire A-to-D converter's 8-bit family code, unique 48-bit serial number, and 8-bit CRC. This command can only be used if there is a single one-wire A-to-D converter 10 on the bus. If more than one slave is present on the bus, a data collision will occur when all slaves try to transmit at the same time (open drain will produce a wired-AND result). The resultant family code and 48-bit serial number will result in a mismatch of the CRC.

MATCH ROM: The match ROM command, followed by a 64-bit ROM sequence, allows the bus master 40 to address a specific one-wire A-to-D converter 10 on a multidrop bus. Only the one-wire A-to-D converter that exactly matches the 64-bit ROM sequence will respond to the following memory/convert function command. All slaves that do not match the 64-bit ROM sequence will wait for a reset pulse. This command can be used with a single or multiple devices on the bus.

SKIP ROM: This command can save time in a single drop bus system by allowing the bus master 40 to access the memory/convert functions without providing the 64-bit ROM code. If more than one slave is present on the bus and a read command is issued following the Skip ROM command, data collision will occur on the bus as multiple slaves transmit simultaneously (open drain pull-downs will produce a wired-AND result).

SEARCH ROM: When a system is initially brought up, the bus master might not know the number of devices on the one-wire bus and their 64-bit ROM codes. The search ROM command allows the bus master to use a process of elimination to identify the 64-bit ROM codes of all slave devices on the bus. The search ROM process is the repetition of a simple 3-step routine: read a bit, read the complement of the bit, then write the desired value of that bit. The bus master performs this simple, 3-step routine on each bit of the ROM. After one complete pass, the bus master knows the contents of the ROM in one device. The remaining number of devices and their ROM codes may be identified by additional passes.

CONDITIONAL SEARCH: The Conditional Search ROM command operates similarly to the Search ROM command except that only devices fulfilling the specified condition will participate in the search. The one-wire A-to-D converter device will respond to the Conditional Search command if a channel's alarm enable flags AEH and/or AEL are set and the conversion results in a value outside the range specified by the channel's alarm threshold voltages. The Conditional Search ROM provides an efficient means for the bus master to determine devices on a multidrop system that have to signal an important event, such as a voltage leaving the tolerance band. After each pass of the Conditional Search that successfully determined the 64-bit ROM for a specific device on the multidrop bus, that particular device can be individually accessed as if a Match ROM had been issued since all other devices will have dropped out of the search process and are waiting for a reset pulse.

OVERDRIVE SKIP ROM: On a single-drop bus this command can save time by allowing the bus master to access the memory/convert functions without providing the 64-bit ROM code. Unlike the normal Skip ROM command the Overdrive Skip ROM sets the one-wire A-to-D converter device in the Overdrive Mode (OD=1). All communication following this command has to occur at Overdrive Speed until a reset pulse of minimum 480 $\mu$s duration resets all devices on the bus to regular speed (OD=0).

When issued on a multidrop bus this command will set all Overdrive-supporting devices into Overdrive mode. To subsequently address a specific Overdrive-supporting device, a reset pulse at Overdrive speed has to be issued followed by a Match ROM or Search ROM command sequence. This will speed up the time for the search process. If more than one slave supporting Overdrive is present on the bus and the Overdrive Skip ROM command is followed by a read command, data collision will occur on the bus as multiple slaves transmit simultaneously (open drain pull-downs will produce a wired-AND result).

OVERDRIVE MATCH ROM: The Overdrive Match ROM command, followed by a 64-bit ROM sequence transmitted at Overdrive Speed, allows the bus master to address a specific one-wire A-to-D converter device that exactly matches the 64-bit ROM sequence will respond to the subsequent memory/convert function command. Slaves already in Overdrive mode from a previous Overdrive Skip or Match command will remain in Overdrive mode. All other slaves that do not match the 64-bit ROM sequence or do not support Overdrive will return to or remain at regular speed and wait for a reset pulse of minimum 480 $\mu$s duration. The Overdrive Match ROM command can be used with a single or multiple devices on the bus.

ONE-WIRE SIGNALING: The one-wire A-to-D converter requires protocols to insure data integrity. The preferred protocol consists of four types of signaling on one line: reset sequence with reset pulse and presence pulse, Write 0, Write 1 and Read Data. All these signals except presence pulse are initiated by the bus master. The one-wire A-to-D converter can communicate at two different speeds, regular speed and Overdrive Speed. If not explicitly set into the Overdrive mode, the one-wire A-to-D converter will communicate at regular speed.

As is clearly seen, the present invention is significant in the analog-to-digital converter arena. The present invention is believed to be especially effective when configured an employed as described herein, however, those skilled in the art will readily recognize that numerous variations and substitutions may be made in the invention and its use and configuration to achieve substantially the same results as achieved by the embodiments and, in particular, the preferred embodiment described herein. Each variation is intended to be included in the description herein and forms a part of the present invention. The foregoing detailed description is, thus, to be clearly understood as being given by way of illustration and example only, the spirit and scope of the present invention being limited solely by the appended claims.

What is claimed is:

1. An integrated circuit for converting an analog signal to a digital signal and providing said digital signal to a host device via a single wire data bus, said integrated circuit comprising:

input/output circuitry for connecting to said single wire data bus;

analog to digital conversion circuitry for providing a digital signal to said input/output circuitry;

an analog input for connecting an analog signal source and for providing an analog signal to said analog to digital conversion circuitry;

a non-volatile memory for storing trim codes for calibrating said analog to digital conversion circuitry; and a memory device connected to the non-volatile memory, said memory device for storing a multibit conversion resolution indicator, said multibit conversion resolution indicator for controlling a conversion resolution of said analog to digital conversion circuitry;

wherein said integrated circuit is operable parasitically from said single wire data bus and wherein said integrated circuit further comprises a unique address.

2. The integrated circuit of claim 1, wherein said analog input comprises four analog input connections connected to a four to one multiplexer, said multiplexer providing one of said four analog input connections to said analog to digital conversion circuitry.

3. The integrated circuit of claim 1, wherein said analog to digital conversion circuitry is configurable to provide a plurality of conversion resolutions.

4. The integrated circuit of claim 1, wherein said integrated circuit uses less than 5 milliwatts of power while active.

5. The integrated circuit of claim 1, wherein said single wire data bus utilizes a One-Wire data protocol.

6. An analog to digital converter comprising:

at least one analog input for receiving an analog signal from an external analog signal producing device;

an analog to digital conversion circuit;

a memory device connected to the analog to digital conversion circuit, said memory device for storing at least three conversion resolutions;

means for connecting said at least one analog input to said digital conversion circuit;

a plurality of registers for storing an output of said analog to digital conversion circuit wherein said output corresponds to one of said at least three conversion resolutions; and input/output circuitry for retrieving said output of said analog to digital conversion circuit and providing said output to a single wire bus;

wherein said analog to digital converter is powered parasitically from said single wire bus and wherein said integrated circuit further comprises a unique address.

7. The analog to digital converter of claim 6, wherein said means connecting said at least one analog input to said digital conversion circuit comprises a MUX circuit with an input from the at least one analog input and an output to said analog to digital conversion circuit.

8. The analog to digital converter of claim 6, further comprising EPROM circuitry for storing trim code information, said trim code information comprising information for calibrating said analog to digital conversion circuitry.

9. The analog to digital converter of claim 6, wherein said analog to digital converter can be programmed to convert each one of said at least one analog inputs to a digital signal with a different resolution.

10. The analog to digital converter of claim 6, wherein said plurality of registers can also store alarm conditions indicating that said analog input is above or below a predetermined voltage.

11. An integrated circuit for converting a first and a second analog signal to a digital signal and providing said digital second to a host device via a single wire data bus, said integrated circuit comprising:

input/output circuitry for connecting to said single wire data bus;

analog to digital conversion circuitry for providing said digital signal to said input/output circuitry;

a first analog input for receiving said first analog signal and for providing said first analog signal to said analog to digital conversion circuitry;

a second analog input for receiving said second analog signal and for providing said second analog signal to said analog to digital conversion circuitry;

a first memory location associated with said first analog input, said first memory location for storing a first plurality of bits indicative of a first conversion resolution; and a second memory location associated with said second analog input, said second memory location for storing a second plurality of bits indicative of a second conversion resolution;

wherein said analog to digital conversion circuitry is configured to utilize said first conversion resolutions responsive to conversion of said first analog signal to said digital signal and wherein said analog to digital conversion circuitry is configured to utilize said second conversion resolution responsive to conversion of said second analog signal to said digital signal and wherein said integrated circuit further comprises a unique address.

12. The integrated circuit of claim 11, wherein said integrated circuit is operable parasitically from said single wire data bus.

* * * * *